United States Patent [19]

Waligorski

[11] Patent Number: 5,121,848

[45] Date of Patent: Jun. 16, 1992

[54] COOKING UTENSIL WITH IMPROVED HANDLE

[75] Inventor: Gordon J. Waligorski, Delphi, Ind.

[73] Assignee: General Housewares Corp., Stamford, Conn.

[21] Appl. No.: 687,286

[22] Filed: Apr. 18, 1991

[51] Int. Cl.⁵ .............................................. B65D 25/28
[52] U.S. Cl. .................................... 220/94 R; 220/912
[58] Field of Search ............................ 220/94 R, 912

[56] References Cited

U.S. PATENT DOCUMENTS

| | | | |
|---|---|---|---|
| 93,271 | 8/1869 | Bigelow | 220/94 R |
| 216,346 | 6/1879 | Read | 220/94 R |
| 649,258 | 5/1900 | Peacock | 220/94 R |
| 1,282,552 | 10/1918 | Duncan . | |
| 1,317,715 | 10/1919 | Luttringhaus . | |
| 1,319,878 | 10/1919 | Lewis | 220/912 X |
| 1,837,109 | 12/1931 | Burvenick . | |
| 2,011,752 | 8/1935 | Christman . | |
| 2,337,120 | 12/1943 | McMullen . | |
| 2,362,720 | 11/1944 | Reichart | 220/94 R |
| 2,473,964 | 6/1949 | Moore | 220/94 R |
| 2,515,617 | 7/1950 | Tilford | 220/912 X |
| 2,881,945 | 4/1959 | Rappaport | 220/94 R |
| 3,347,404 | 10/1967 | McIntyre | 220/94 R |
| 4,413,767 | 11/1983 | Hellinger . | |
| 4,565,296 | 1/1986 | Lam | 220/94 R |
| 4,680,829 | 7/1987 | Baumgarten . | |
| 4,926,521 | 5/1990 | Gagnepain . | |

Primary Examiner—Steven M. Pollard
Attorney, Agent, or Firm—Emrich & Dithmar

[57] ABSTRACT

A cooking utensil comprising a vessel with an upstanding side wall has a unitary, one-piece, metal handle which is bent to form an elongated, generally tubular, main portion having a transverse cross section which is generally C-shaped when rotated about its longitudinal axis approximately 90 degrees counterclockwise from its use orientation. Two convex legs project longitudinally from the vessel end of the main portion at opposite sides thereof and have the distal ends thereof bent laterally outwardly therefrom along substantially vertical bend lines to define attachment feet which are welded to the vessel side wall. The legs define therebetween an opening which extends longitudinally into the handle well beyond the periphery of the vessel and has a minimum width laterally of the handle substantially greater than the maximum lateral extent of either of the legs. Two arms curve toward each other from the distal end of the handle for cooperation therewith to define a loop.

19 Claims, 1 Drawing Sheet

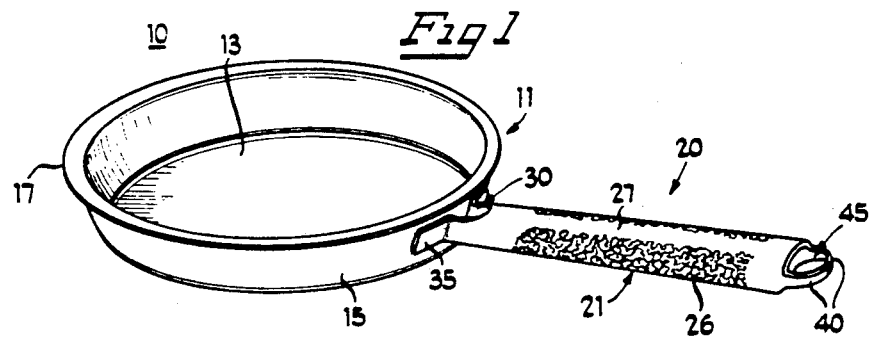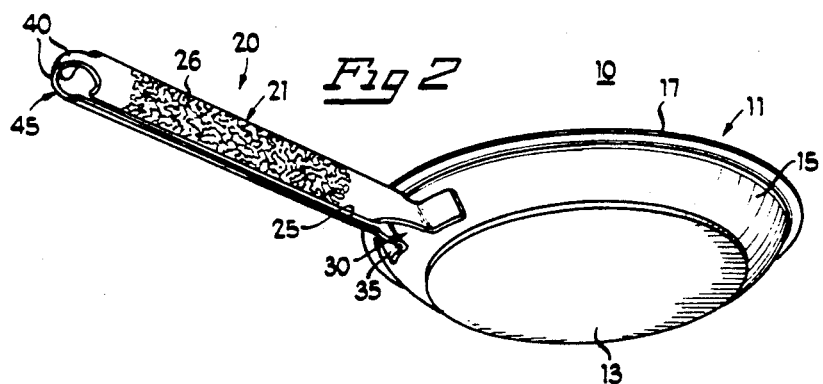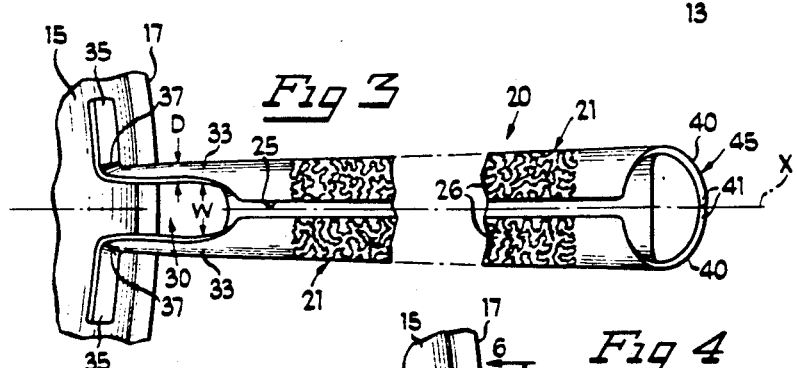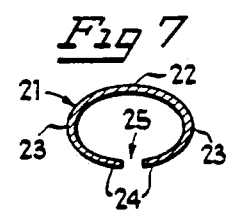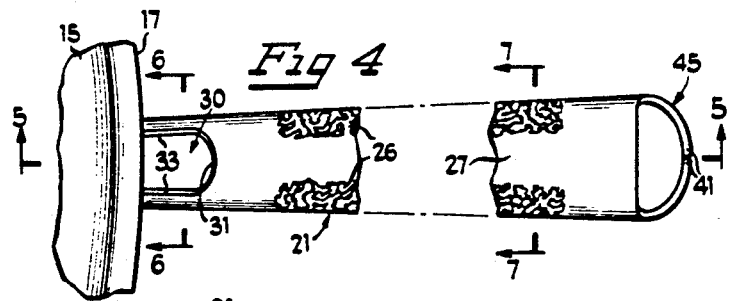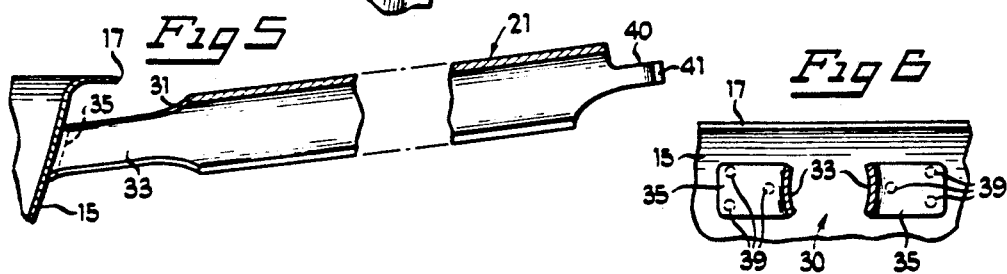

COOKING UTENSIL WITH IMPROVED HANDLE

BACKGROUND OF THE INVENTION

1. Field of the Invention

The present invention relates to cooking utensils, specifically cooking vessels, and in particular to handles therefor.

2. Description of the Prior Art

Much present day commercially available cookware, such as pots, pans, skillets and the like, is generally of all metal construction which includes a cooking vessel or receptacle and a one-piece metal handle which is fixedly secured to the vessel. Such arrangements are disclosed, for example, in U.S. Pat. Nos. 1,837,109 and 4,413,767. In these prior cooking vessels, the handle has an attachment flange or flanges which are secured to the vessel by studs or rivets. The flanges have been bent from the handle along a generally horizontal bend line which creates an area of weakness for concentration of forces applied to the handle in use so that the handle will tend to bend with respect to the vessel about this bend line. Over extended use, the handle may break at this bend line. Also, the riveted attachment to the vessel adds parts and complexity to the construction. The rivets also provide additional points of possible failure of the handle.

It is known to provide welded attachments of metal handle attachment flanges to cookware vessels, as disclosed in U.S. Pat. No. 2,011,752. But this does not alleviate the problem of bending of the handle with respect to the flanges.

It is also known to provide handle assemblies including attachment flanges which are bent laterally from the handle along generally vertical bend lines, but these handle assemblies have been of relatively complex construction, affording additional points of potential failure and/or loosening in the handle.

Another significant drawback of one-piece handles in prior metal cookware constructions has been the transfer of heat to the handle by both convection from the heating source and conduction from the cookware vessel. This may make the handle too hot to be grasped by a user's bare hand, necessitating the use of a thermal insulating material on the handle.

SUMMARY OF THE INVENTION

It is a general object of the present invention to provide a cooking utensil with an improved handle construction which avoids the disadvantages of prior constructions while affording additional structural and operating advantages.

An important feature of the invention is the provision of a cooking utensil having a handle which is of simple and economical construction and which is not subject to bending, loosening or other failure in use.

In connection with the foregoing feature, it is another feature of the invention to provide a cooking utensil of the type set forth which has a one-piece metal handle.

Another feature of the invention is the provision of a cooking utensil of the type set forth which minimizes transfer of heat to the handle.

In connection with the foregoing feature, yet another feature of the invention is the provision of a cooking utensil of the type set forth, wherein the handle is of one-piece metal construction and is uniquely shaped and configured so as to remain cool in use.

These and other features of the invention are attained by providing a cooking utensil comprising: a utensil body; a unitary one-piece metal handle having an elongated generally tubular main portion, the handle including a pair of spaced-apart attachment feet projecting from the main portion at one end thereof and respectively bent laterally outwardly therefrom along two bend lines; and weldments fixedly securing the attachment feet to the utensil body so that the bend lines are disposed generally vertically in use.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a top perspective view of a cooking utensil constructed in accordance with and embodying the features of the present invention;

FIG. 2 is a bottom perspective view of the cooking utensil of FIG. 1;

FIG. 3 is an enlarged, fragmentary, bottom plan view of the handle of the cooking utensil of FIGS. 1 and 2;

FIG. 4 is a fragmentary top plan view of the handle of FIG. 3

FIG. 5 is a fragmentary view in vertical section taken along the line 5—5 in FIG. 4;

FIG. 6 is a fragmentary view in vertical section taken along the line 6—6 in FIG. 4; and FIG. 7 is a view in vertical section taken along the line 7—7 in FIG. 4.

DESCRIPTION OF THE PREFERRED EMBODIMENT

Referring to FIGS. and 2, there is illustrated a cooking utensil 10 constructed in accordance with and embodying the features of the present invention. The cooking utensil 10 includes a cooking vessel or receptacle 11 having a generally flat, circular, bottom wall 13 integral around the perimeter thereof with an upstanding and slightly outwardly sloping side wall 15. Integral with the side wall 15 at its upper edge and projecting radially outwardly therefrom around the entire circumference thereof is a lip 17. While the vessel 11 is illustrated as a skillet or frying pan, it will be appreciated that it could take any of a number of different forms, including all of the various types of pots, pans, griddles and other types of cookware.

Referring also to FIGS. 3-7, the cooking utensil 10 includes a handle 20 which is of unitary, one-piece, metal construction. Preferably, the handle 20 is formed of a single sheet of metal which is bent to the unique configuration illustrated in the drawings. More specifically, the handle 20 has an elongated, generally tubular, hollow, main portion 21 which is bilaterally symmetrical about a longitudinal axial plane X (FIG. 3). The main portion 21 is generally C-shaped in transverse cross section with the C opening downwardly, as can best be seen in FIG. 7, when the handle 20 is disposed in its use orientation. Thus, the main portion 21 of the handle 20 comprises a continuous generally oval-shaped wall which includes a top portion 22, side portions 23 and bottom portions 24 which are separated by a gap 25 which runs the length of the main portion 21 (FIGS. 3 and 7). Preferably, the handle 20 is slightly tapered along its length, so that it has a slightly smaller circumference at the end adjacent to the vessel 11 than it does at its distal end, as can best be seen in FIGS. 3 and 4. The main portion 21 may be provided with two roughened areas 26 on its outer surface, the roughened areas 26 being separated by a border area 27 extending longitudinally of the handle 20 along the top portion 22 and extending peripherally all the way to the gap 25. The roughened areas 26 serve to provide a non-slip surface to inhibit slipping in the hand of a user and, while in the preferred embodiment of the invention they are formed by etching, they may also be formed by embossing.

The end of the handle 20 proximate the vessel 11 has an opening 30 extending vertically in use through the top and bottom portions 22 and 24 and extending longitudinally of the handle 20 from an arcuate end edge 31 all the way to the proximal end of the handle 20. The opening 30 serves to define a pair of laterally spaced-apart legs 33, respectively disposed along opposite sides of the handle 20 and projecting longitudinally from the proximal end thereof. Respectively integral with the ends of the legs 33 are attachment feet 35 which are bent laterally outwardly from the legs 33 along bend lines 37. The attachment feet 35 are fixedly secured to the outer surface of the vessel side wall 15, intermediate the bottom wall 13 and the lip 17, by suitable weldments. Preferably, each of the attachment feet 35 is secured by a triangular array of spot welds 39 (FIG. 6).

Respectively projecting longitudinally outwardly from the side portions 23 of the handle 20 at its distal end are two relatively thin arms 40, which are bent toward each other so that their respective tips 41 are disposed in engagement or in very close proximity to each other for cooperation with the adjacent end of the main portion 21 to define a loop 45 to facilitate hanging the cooking utensil 10 from a hook or the like for storage.

As can best be seen in FIG. 5, the handle 20 is preferably designed so that the attachment feet 35 will lie flush against the outer surface of the vessel side wall 15, with the handle 20 inclined slightly upwardly from the horizontal at an ergonomically comfortable angle, such as about 12°. It is a significant aspect of the invention that the bend lines 37 are disposed generally vertically in use along the vertical width of the legs 33 and the attachment feet 35, i.e., generally in the direction of the load forces which are applied to the handle 20 in use. There results a handle attachment to the vessel 11 which is extremely strong and not susceptible to bending or weakening in use. Indeed, in use, it is virtually impossible to bend the handle 20 upwardly or downwardly relative to the vessel 11. The generally C-shaped cross section of the handle main portion 21 also imparts rigidity so that the handle 20 cannot be bent anywhere along its length. Indeed, it has been found that the slightly convex nature of the legs 33, as viewed from the outside thereof (see FIG. 6), significantly improves their lateral or side-to-side strength at their junctions with the attachment feet 35, as compared with flat legs.

Another significant aspect of the invention is that it minimizes heat transfer to the main portion 21 of the handle 20 by either convection or conduction. In this regard, it will be noted that the opening 30 in the handle 20 extends longitudinally outwardly along the handle 20 well beyond the periphery of the vessel lip 17. The width W of the opening 30 may taper slightly from its outer end 31, narrowing toward the vessel 11, as does the overall handle 20. Similarly, the lateral dimension D of the legs 33 may vary slightly along their length. However, it is a fundamental aspect of the invention that the minimum width W of the opening 30 is substantially greater than the maximum lateral dimension D of either of the legs 33. In other words, the lateral dimension D of the legs 33 is relatively small. Thus, heat which radiates outwardly and upwardly along the outer surface of the vessel side wall 15 from the heating source tends to pass upwardly through the relatively wide opening 30 and "sees" relatively narrow legs 33, so that very little heat is passed by convection into the main portion 21 of the handle 20.

Also, each of the legs 33 has a very small cross-sectional area, as can best be sen in FIG. 6, thereby minimizing the transfer of heat by conduction from the vessel side wall 15 and the attachment feet 35 into the main portion 21 of the handle 20. Furthermore, it will be appreciated that the hollow, generally tubular construction of the main portion 21 also presents a relatively small cross-sectional area (see FIG. 7) for transfer of heat by conduction. The opening 30, in cooperation with the gap 25, also serves to facilitate a free flow of ambient air through the handle 20 to enhance cooling thereof. As a result, when the vessel 11 is centered over the heating source, the unique construction of the handle 20 serves to maintain it at a sufficiently low temperature so that it can be comfortably grasped by the bare hand of a user.

In a constructional model of the present invention, the vessel 11 and the handle 20 are formed of stainless steel, with the bottom wall 13 of the vessel 11 preferably comprising a sandwich of a thin layer of copper between two layers of stainless steel to enhance thermal conductivity and temperature uniformity throughout the bottom of the vessel 11. However, it will be appreciated that any suitable type of metal could be used for the vessel 11 and the handle 20. Also, while the preferred embodiment of the invention 20 is a tapered handle cut and folded or bent from a single sheet of metal, the handle could also be of a cylindrical, non-tapered shape, in which case it could be formed by extrusion of the main portion and then cutting and bending the arms, legs and feet from the extruded tube.

From the foregoing, it can be seen that there has been provided a cooking utensil with an improved seamless, one-piece, metal handle which is of simple and economical construction characterized by great strength and rigidity and which remains comfortably cool in use.

I claim:

1. A cooking utensil comprising: a utensil body; a unitary one-piece metal handle having an elongated generally tubular main portion, said handle including a pair of legs respectively disposed at opposite sides of said main portion and projecting longitudinally therefrom at one end thereof, and a pair of attachment feet respectively unitary with said legs at the distal ends thereof and respectively bent laterally outwardly therefrom along two bend lines; and weldments fixedly securing said attachment feet to said utensil body so that said bend lines are disposed generally vertically in use, said legs having a length such that said tubular main portion of said handle is spaced from said utensil body in use, said legs spaced apart laterally of said main portion for cooperation to define therebetween an opening extending vertically through said handle in use, said opening extending longitudinally of said handle outwardly beyond the periphery of said utensil body in use.

2. The cooking utensil of claim 1, wherein said main portion of said handle is hollow.

3. The cooking utensil of claim 2, wherein said main portion of said handle, when rotated about its longitudinal axis 90 degrees counterclockwise from its use orientation, is generally C-shaped in transverse cross section.

4. The cooking utensil of claim 1, wherein said utensil body includes a cooking vessel having an upstanding side wall, said attachment feet being fixedly secured to said side wall.

5. The cooking utensil of claim 1 wherein said handle further includes arm structure projecting from said main portion at the other end thereof for cooperation therewith to define a loop.

6. A cooking utensil comprising: a utensil body; a unitary one-piece metal handle discrete from said utensil body, having an elongated generally tubular main portion; and attachment means at one end of said handle fixedly secured to said utensil body; said handle having an opening extending vertically through said tubular main portion in use adjacent to said utensil body so as to form a pair of handle side portions laterally spaced apart by said opening, said opening extending longitudinally of said handle outwardly from the periphery of said utensil body and extending laterally of said handle a minimum distance substantially greater than the maximum lateral extend of either of said side portions, said attachment means comprising spaced apart distal ends of said side portions extending laterally outwardly of said side portions.

7. The cooking utensil of claim 6, wherein said main portion of said handle is hollow.

8. The cooking utensil of claim 7, wherein said opening communicates with the interior of said main portion of said handle.

9. The cooking utensil of claim 6, wherein said opening extends to said utensil body.

10. The cooking utensil of claim 9, wherein said handle side portions define a pair of legs respectively disposed at opposite sides of said main portion and projecting longitudinally therefrom.

11. The cooking utensil of claim 10, wherein said attachment means includes a pair of attachment feet respectively projecting from the distal ends of said legs and respectively bent laterally outwardly therefrom along two bend lines.

12. The cooking utensil of claim 11, wherein said attachment means includes weldments fixedly securing said attachment feet to said utensil body so that said bend lines are disposed generally vertically in use.

13. A cooking utensil comprising: a utensil body; a unitary one-piece sheet metal handle having an elongated main portion generally C-shaped in transverse cross section, said handle including a pair of arms respectively disposed at opposite sides of said main portion and projecting longitudinally therefrom at one end thereof, said arms being bent so as to bring the distal ends thereof together for cooperation with said main portion to define a loop, a pair of legs respectively disposed at opposite sides of said main portion and projecting longitudinally therefrom at the other end thereof, said legs being spaced apart laterally of said main portion for cooperation to define therebetween an opening extending vertically through said handle in use, and a pair of attachment feet respectively projecting from the distal ends of said legs and respectively bent laterally outwardly therefrom along two bend lines; and weldments fixedly securing said feet to said utensil body so that said bend lines are disposed generally vertically in use, said opening extending longitudinally of said handle outwardly beyond the periphery of said utensil body in use.

14. The cooking utensil of claim 13, wherein in the use orientation of said handle said generally C-shaped transverse cross section of said main portion opens downwardly.

15. The cooking utensil of claim 13, wherein said legs are convex as viewed from the outside thereof.

16. The cooking utensil of claim 13, wherein the vertical extend of said attachment feet in use is at least as great as that of said legs.

17. The cooking utensil of claim 13, wherein said opening extends laterally of said handle a minimum distance substantially greater than the maximum lateral extend of either of said legs.

18. The cooking utensil of claim 13, wherein said main portion of said handle has an outer surface with a roughened area to inhibit slippage in a user's hand.

19. The cooking utensil of claim 18, wherein said roughened area is etched in said outer surface.

* * * * *